United States Patent [19]

Gans

[11] 4,347,065
[45] Aug. 31, 1982

[54] PROCESS FOR THE SEPARATION OF PAINT MISTS FROM THE EXHAUST AIR OF LACQUER PAINTING PLANTS

[75] Inventor: Wolfgang Gans, Stuttgart, Fed. Rep. of Germany

[73] Assignee: Daimler-Benz Aktiengesellschaft, Stuttgart, Fed. Rep. of Germany

[21] Appl. No.: 282,166

[22] Filed: Jul. 10, 1981

[30] Foreign Application Priority Data

Jul. 29, 1980 [DE] Fed. Rep. of Germany ....... 3028706

[51] Int. Cl.$^3$ .............................................. B01D 51/00
[52] U.S. Cl. .............................................. 55/6; 34/4; 55/80; 55/97; 55/267; 55/DIG. 46
[58] Field of Search ....................... 55/6, 9, 97, 1, 124, 55/80, 267, DIG. 46; 34/4, 1; 98/115 SB

[56] References Cited

U.S. PATENT DOCUMENTS

| | | | |
|---|---|---|---|
| 2,227,481 | 1/1941 | Bates | 98/115 SB |
| 3,845,270 | 10/1974 | Widugris, Jr. | 34/1 X |
| 4,055,001 | 10/1977 | Forster et al. | 34/4 X |
| 4,265,642 | 5/1981 | Mir et al. | 98/115 SB X |

FOREIGN PATENT DOCUMENTS 52-13172  2/1977  Japan .................................. 55/267

Primary Examiner—Kathleen J. Prunner
Attorney, Agent, or Firm—Craig and Antonelli

[57] ABSTRACT

A process for the separation of paint mists from the exhaust gases of lacquer painting plants includes a step wherein the exhaust gases containing paint particles comprising the mists are conducted through a microwave field which cures and dries the paint particles to convert the paint particles into a nonsticky dust and a step wherein the thus-produced paint dust is separated from the exhaust gases by a filter device such as a fabric filter.

3 Claims, No Drawings

PROCESS FOR THE SEPARATION OF PAINT MISTS FROM THE EXHAUST AIR OF LACQUER PAINTING PLANTS

Great difficulties have been encountered heretofore in the separation of paint mists from the exhaust air of lacquer painting plants. Due to the tacky consistency of the paint particles, filters clog up in a short period of time; perforated plates and baffles must be frequently cleaned. These problems have been reduced by the use of venturi scrubbers, but venturi scrubbers cannot provide complete separation of the lacquer paint particles, so that an aftertreatment of the exhaust or waste air, for example by means of an active carbon filter for the removal and/or recovery of solvent vapors becomes extraordinarily difficult.

Therefore, it is an object of the invention to find a process making it possible to separate the paint mists without any problems, which process is so effective that, after the separating procedure, further treatment steps can be executed without difficulties.

This object has been attained by the process of the invention wherein the exhaust gases (usually air and vaporized solvents) containing paint particles are passed through a microwave field and thereafter the resulting non-tacky paint dust is separated from the gases by a filter or like conventional means for removing dust from air and like gases.

The principle of the process thus resides in that the uncured, tacky paint particles present in the paint mist are cured and dried by treatment with microwaves and consequently the particles are converted into a non-sticky dust which can be separated simply and completely in accordance with conventional methods for removing or separating dust.

Microwaves are especially well suitable for the curing step, since these very short electromagnetic waves raise all paint particles simultaneously to the temperature at which curing takes place, without superheating individual particles. In this process, the treatment temperature can be considerably higher than the temperature utilized for curing the paint on a lacquered article, since the paint dust consititutes a waste material, and its surface quality or its appearance need not satisfy the requirements to be posed in connection with a painting or lacquering procedure used for automobiles and the like.

The field strength and the frequency of the microwaves are to be chosen, if at all possible, so that the paint particles attain the maximally permissible temperature and are thereby cured within a minimum time period. These parameters are dependent on the type, the reactivity of the paint, and the size of the paint particles and can readily be determined with the aid of a few experiments. Generally, the microwaves have lengths ranging from about 100–350 mm, resp., and a frequency of from 900–3000 MHz. The microwave field is produced by a microwave generator.

After conducting the exhaust air through the microwave field, the thus-produced paint dust can be separated from the exhaust air in a conventional way, for example, by means of a customary fabric filter. The filter can be constructed so that continuous filtering is possible (for example a filter bag with a rapping means). However, it is, of course, also possible to use the other filter devices known to those skilled in the art, or a combination of several filter devices, as they are described, for example, in *Perry, Chemical Engineers' Handbook,* 5th Ed., McGraw-Hill Book Company, New York 1973, Chapter 20, pp. 75 et seq., as long as their size permits the separation of the paint particles.

The removal of the paint mists from the exhaust air attainable by means of the process of this invention is so effective that the treated exhaust air can be recycled into the paint spray booth, optionally after interposing an active carbon filter for the adsorption of solvent vapors contained in the exhaust air; the result is additional savings by the recovered solvent and the reduction in costs for the fresh air recovery treatment.

The process of the invention enables paint dusts produced during painting and lacquering procedures using all known paints and lacquers, for example, water lacquers, organic solvent containing lacquers and paints, or electrostatic lacquers, to be dried. Acrylic lacquers, epoxy resin lacquers, DD lacquers, polyurethane lacquers and alkyd lacquers are very often used. Depending on the paint used, the temperature range within which the paints are normally cured is very large and extends from room temperature to approximately 250° C. (baking finishes). When paint dusts are dried by means of microwaves, increased temperatures of up to 300° C. can be used, depending on the paint, but is it not essential for the paint dust to be fully cured, generally, it is adequate for the paint particles to be powder dry.

What is claimed is:

1. A process for the separation of paint mists from the exhaust gases of lacquer painting plants, characterized in that the exhaust gases containing paint particles comprising the mists are conducted through a microwave field to convert the paint particles to paint dust and the thus-produced paint dust is separated from the exhaust gases by means for removing dust and like solid particles from gases.

2. A process according to claim 1, wherein the microwave field comprises microwaves generated with a frequency of from 900 to 3000 MHz.

3. A process according to claim 2, wherein the microwave field comprises microwaves having wave lengths of from 100 to 350 mm.

* * * * *